Patented July 11, 1944

2,353,230

UNITED STATES PATENT OFFICE 2,353,230

CONDITIONING OF DRILLING FLUIDS

Allen D. Garrison and Karl C. ten Brink, Houston, Tex., assignors, by mesne assignments, to The Texas Company, New York, N. Y., a corporation of Delaware No Drawing. Application July 1, 1939, Serial No. 282,444

11 Claims. (Cl. 252—8.5)

This invention relates to drilling fluids and more particularly to the conditioning of drilling muds employed in the drilling of wells.

One of the principal objects of the invention is to provide a method of conditioning a drilling fluid of this character to maintain its desired properties of viscosity, weight, gel strength and thixotropic character during recirculation in the drilling of a well.

Another object of the invention is to provide a method of conditioning drilling fluids to afford the desired viscosity reduction thereof while at the same time preventing objectionable deflocculation and accumulation in the fluid of clays and shales penetrated by the drilling operation.

Another object of the invention is to provide a method of conditioning drilling fluids to maintain their desired properties in the presence of brine and in the presence of calcium and magnesium salts.

Still another object of the invention is to provide a method of conditioning or reclaiming a cement-cut drilling fluid of this character.

Other objects and advantages of the invention will be apparent from the description and the appended claims.

Drilling fluids or muds are almost universally used in the drilling of wells employed for tapping underground collections of oil, gases, brines and water. These muds fulfill various functions, the most important of which are to assist in the removal of cuttings from the well, to seal off gas pockets which may be encountered at various levels, and to lubricate the drilling tools and the drill pipes which carry the tools.

Drilling muds are essentially mixtures of clay and water, usually so compounded that they weigh from eight to twelve pounds per gallon. Whenever it is found necessary to increase the specific gravity of a particular mud, it is customary to add thereto finely divided materials which have a high specific gravity, such as barytes, etc.

An ideal drilling mud is one which is thixotropic, that is to say, a fluid which, on agitation by pumping or otherwise, has a relatively low viscosity and is free flowing but, when agitation is stopped, gradually sets or gels. This gelling action is sufficiently slow to permit the cuttings to settle two or three feet before the gel structure is strong enough to support them. It is customary to circulate a drilling mud down the hollow drill stem to the locus of drilling where the mud picks up the cuttings, and the mud with suspended cuttings then returns up the well through the annular channel between the drill stem and the well casing. The drilling mud with suspended cuttings is then generally flowed through screens to remove the coarser particles, and then is passed by a suitable flow passage or mud ditch to a settling pit, where the cuttings settle out, leaving a substantially cuttings-free drilling mud which is returned to the well.

Where a drilling mud of the required weight and gel strength has been found to have a higher viscosity than desired, it has been customary to add certain chemicals to the drilling mud in relatively small amounts to lower the viscosity thereof without undesirably affecting other properties of the mud. Various alkali metal silicates, phosphates, and particularly molecularly dehydrated phosphates such as sodium hexametaphosphate, have been employed for this purpose. Alkaline chemicals generally serve to adjust the pH of the drilling fluid to the range of approximately 9.5 to 10.5 where it has been found that clay suspensions have a minimum of viscosity. Certain lyophile colloids, such as gallic acid, tannic acid, and the alkali metal salts thereof, have also been used to protect the suspended clay against flocculation; but such materials are generally ineffective to lower the viscosity of a clay suspension unless used in conjunction with a suitable alkaline viscosity-reducing reagent of the character of those specified above, the proportion of the latter being such as to give the higher pH value of the drilling fluid as previously specified.

It has been recognized that sodium silicate is effective in the deflocculation of clays, not only because it serves to raise the pH of the clay suspensions to the region of 9.5 to 10.5 where the suspensions have a minimum viscosity, but also because the sodium silicate behaves somewhat like the organic protective colloids, in that the clay is rendered more stable by the sodium silicate than it would otherwise be at the same pH. The prior practice has proceeded under the assumption that the chemical control should be applied to get the minimum viscosity which may be obtained in a given clay suspension by adjusting the pH to the above mentioned range, and then obtain the beneficial effect of some protective colloid.

We have found that this method is not always the most economical one to adopt in the control of a drilling fluid in the field. It has been found that certain types of shales and clays encountered during the drilling operation have a marked tendency to become dispersed in the drilling fluid and to become deflocculated to colloidal sizes.

This effect in the drilling fluid is the same as would be obtained by the addition of highly colloidal clays, such as bentonite; and when such colloidal clays are added or accumulated in excessive amounts, the drilling fluid becomes so thick that it cannot be properly handled.

It is frequently desirable to maintain the weight of the drilling fluid at some fixed value. When alkaline chemicals are added to the drilling fluid to reduce the viscosity thereof, allowance is frequently made for the accumulation of natural clays and shales in the fluid during the progress of drilling, which thereby increase its weight. This method, however, necessitates more or less continuous variation in the weight of the drilling fluid during the progress of drilling by reason of this continuous accumulation. Moreover, as the shales and clays penetrated during continued drilling deflocculate and accumulate in the drilling fluid in excessive amounts, then the need for further reduction in viscosity appears after a few hours or a few days of operation, requiring the addition of further viscosity-reducing chemicals. Ultimately so high a concentration of clay develops in the fluid that it becomes impossible to reduce the viscosity by chemical means, and it is then necessary to dilute the suspension with water. Obviously, this involves the addition of more weighting material to the diluted suspension to maintain the desired density of the drilling fluid. This cycle of addition of further quantities of chemicals, dilution with water, and addition of further quantities of weighting material during the progress of drilling very substantially increases the expense of the operation.

The present invention provides a method of conditioning the drilling fluid so as to avoid or materially reduce the necessity for this cycle of repeated additions of chemical and weighting materials coupled with dilution of the drilling fluid, by largely preventing or minimizing the accumulation of clays and shales in the drilling fluid during the progress of drilling. The invention coordinates the addition of chemical to effect viscosity reduction with the effect of the chemical on the rate of accumulation of shales and clays in the drilling fluid during subsequent operations. We have found that certain shales and clays representative of those penetrated during drilling deflocculate and accumulate in the drilling fluid much more rapidly in the pH range mentioned above, that is, at a pH range above about 8.5. The higher the pH above this limiting value, the more rapid is this undesirable deflocculation. Sodium silicate in small amounts in the drilling fluid retards this deflocculating action, provided the pH is the same as the case with which it is being compared. But the addition of sodium silicate alone to a drilling fluid invariably raises the pH. Where relatively large amounts of sodium silicate are used for viscosity control, the rising pH more than offsets the beneficial effect of the silicate in retarding deflocculation and accumulation and, although the viscosity is initially lowered by the addition of the silicate, further drilling results in an accumulation of deflocculated shale particles in the mud at a more rapid rate, with a net increase in viscosity of the drilling fluid.

We have further discovered that a high pH is not necessary to the beneficial action of the sodium silicate as a viscosity-reducing agent, but that after the sodium silicate has been added the pH may be lowered by the addition of an acid-reacting material of the character of carbon dioxide or a phosphoric acid to the range of approximately 7.5 to 8.5. We have found that a drilling fluid thus conditioned may have a lower viscosity than before the treatment, and at the same time exhibit less deflocculating action on particles of shale which may be suspended therein by further drilling. Such shale particles then primarily settle out with the cuttings in the settling pit, so that the weight and viscosity of the drilling mud is essentially maintained. The order in which these chemicals are added appears immaterial, in that satisfactory results have been obtained by first adding carbon dioxide to the drilling fluid followed by the addition of the silicate, the chemicals being used in the required proportions to afford a pH of the drilling fluid within the lower range specified immediately above.

As a further feature of the present invention, we contemplate the employment of a major proportion of an alkali metal silicate with a minor proportion of an alkali metal salt of a water-soluble molecularly dehydrated phosphate viscosity reducing agent to obtain viscosity reduction in conjunction with the use of carbon dioxide or a phosphoric acid to give the required pH control. Any of the water-soluble molecularly dehydrated phosphate viscosity-reducing agents such as the pyrophosphates, the triphosphates, the tetraphosphates and the hexametaphosphates may be used for this purpose. Sodium hexametaphosphate represents a very satisfactory material of this character. We have found that it is possible to reduce the viscosity of shale suspensions by a combination of the silicate and such a phosphate below that which can be obtained with either reagent alone. Furthermore, it is possible to obtain a reduction in viscosity with a combination of sodium silicate and a molecularly dehydrated phosphate viscosity-reducing agent comparable to that which can be obtained with the phosphates alone when used in approximately five to six times the amount of the phosphate used in the combination. For example, a shale suspension was deflocculated with 0.1 gram per 100 cubic centimeters of sodium silicate and 0.04 gram of sodium pyrophosphate, and a reduction in viscosity was obtained which could be equaled only by the addition of as much as 0.14 gram of the pyrophosphate alone. Since the sodium silicate is cheaper, and since the pyrophosphates are somewhat unstable, it is readily seen that the combination of the two materials is decidedly better than the pyrophosphate alone.

In another case, 0.1 gram of sodium silicate in 100 cubic centimeters of drilling fluid together with 0.02 gram of sodium pyrophosphate caused a greater reduction in viscosity than could be obtained in the same drilling fluid by the addition of 0.12 gram of any of the molecularly dehydrated phosphates alone. Since the molecularly dehydrated phosphates rehydrate with time, and since the loss with time is proportional to the amount in the drilling fluid when other factors are constant, it is clear that the maintenance of the viscosity at the low level in the above cases will require an expenditure of only about one-fifth to one-sixth of the amount of the phosphate required alone, by reason of combining the said phosphate with sodium silicate in the treating process.

It is recognized that the amount of sodium silicate which should be added to the drilling fluid to obtain the desired viscosity reduction cannot be definitely fixed without some investigation of the drilling fluid involved. It is a property of the sodium silicate to reduce the viscosity of clays and shales up to a certain point. Additions of the sodium silicate in excess of this amount cause a reversed trend with some increase in viscosity. A preferred method of operation in accordance with our invention consists of maintaining an amount of sodium silicate in the drilling fluid near the optimum quantity for viscosity reduction, and then introducing carbon dioxide or phosphoric acid in as large quantities as required to maintain the pH of the drilling fluid within the lower range specified above. The carbon dioxide or other acid-reacting material may be introduced at any time before or after the addition of more sodium silicate to the circulating drilling fluid. Where it is desirable to further reduce the viscosity below that which is attainable with sodium silicate alone, then a quantity of a molecularly dehydrated phosphate viscosity-reducing agent is also added to the drilling fluid containing the sodium silicate, the pH of which is controlled by the addition of carbon dioxide or a phosphoric acid.

Where a phosphoric acid is used as the acid-reacting material, this may conveniently be accomplished by adding a portion of a molecularly dehydrated phosphate viscosity-reducing agent in the form of its acid rather than in the form of the sodium salt. After addition of a suitable amount of the acid to control the pH of the drilling fluid containing sodium silicate, a further quantity of the molecularly dehydrated phosphate may be added in the form of its sodium salt to give a further viscosity reduction. In general, the quantity of sodium silicate employed may vary from about 0.05 to 0.15% by weight of the aqueous phase of the drilling fluid, while the proportion of the molecularly dehydrated phosphate may vary from about 0.01 to 0.05% by weight; while the phosphoric acid or the carbon dioxide may be intermittently or continuously added to the circulating drilling mud to maintain the desired pH range of about 7.5 to 8.5.

In the co-pending application of Allen D. Garrison Serial No. 282,445, filed of even date herewith, now U. S. Patent No. 2,338,174 there is disclosed and claimed the treatment of a circulating drilling mud generally with carbon dioxide to condition that mud. The present application discloses and claims the conditioning of a drilling mud by the conjoint use of sodium silicate, or sodium silicate together with a molecularly dehydrated phosphate viscosity-reducing agent, with an acid-reacting material of the character of carbon dioxide or a phosphoric acid to obtain the double advantage of maximum viscosity reduction of the drilling fluid while at the same time avoiding or minimizing objectionable deflocculation and accumulation of clay or shale in the fluid during the progress of drilling.

The carbon dioxide and other chemicals may be conveniently added to the drilling fluid during its circulation by the method disclosed and claimed in the above mentioned Garrison application, in which the carbon dioxide gas or other chemicals are aspirated into the mud stream by the suction effect of an aspirator mud gun employed in facilitating the flow and agitating the drilling mud with suspended cuttings passing from the well through the flow passage or mud ditch to the settling pit. Any suitable source of carbon dioxide gas may be employed, such as a relatively pure carbon dioxide from a pressure container holding the liquefied gas, or a gas containing a smaller proportion of carbon dioxide such as flue gas.

The method of the present invention has been found particularly effective in conditioning drilling fluids which have become contaminated with brine or salt. We have encountered certain shales that are more effectively treated with small amounts of sodium silicate than by any other known deflocculating agent. Where the combination of sodium silicate and carbon dioxide is employed in these cases, we obtain the advantage of the most effective deflocculating agent without the disadvantage of the high pH described above. Further, in the presence of calcium and magnesium salts in the drilling fluid, there is an additional advantage in the simultaneous use of sodium silicate and carbon dioxide, which resides in the removal of such calcium and magnesium salts from the drilling fluid without detrimental effect. The viscosity-reducing effect of sodium silicate alone is counteracted by the presence of calcium and magnesium salts, which react with the sodium silicate with the production of voluminous precipitates of calcium and magnesium silicates which are more or less colloidal in character and which tend to raise materially the effective viscosity and gelling rate of the drilling fluid. We have found that the presence of the carbon dioxide causes the precipitation of calcium or magnesium carbonate rather than the precipitation of the corresponding silicates. The carbonate precipitate is granular and of a small volume so that it does not contribute materially to the viscosity of the drilling fluid.

A further advantage of the present invention resides in the method of conditioning or reclaiming cement-cut drilling muds. In the well drilling phase of the oil industry, much cement is used for various purposes, foremost among which are casing cementing, open hole plugging and squeezing jobs. In these operations, or when drilling through the cement with recirculation of drilling mud, the mud becomes contaminated with the cement. The effect of the cement cuttings on drilling muds is to lend the mud such an excessively high viscosity and gel strength that it is usually necessary to dispose of the mud and add new mud to the circulating system, involving a considerable expenditure for additional labor, time and mud.

A compound in cement which is highly detrimental to a drilling mud is calcium hydroxide. This compound is fairly soluble in the aqueous phase and rapidly ionizes to calcium and hydroxyl ions. Either of these ions in excess destroys the desirable qualities of a drilling mud. By the combination of sodium silicate and carbon dioxide in desired proportions, the viscosity of the mud is reduced to the required extent, while at the same time the calcium is removed by precipitation as calcium carbonate.

By way of example of the effectiveness of the present invention in conditioning drilling mud containing salt, there was treated a drilling mud from the Manvel field containing a suspension of shales accumulated through the drilling of surface clays to a depth at which the Oligocene shales were encountered, and containing about 1% of salt and having a Stormer viscosity at 100 R. P. M. of 107 centipoises. The addition of 0.1 gram per 100 cubic centimeters of sodium hexametaphosphate alone to this mud reduced the viscosity to 82 centipoises. The addition of 0.1 gram of sodium silicate, having a ratio of silica to sodium oxide of about 3.2:1, reduced the viscosity to 61 centipoises. The addition of 0.1 gram of this sodium silicate together with 0.04 gram of the hexametaphosphate gave a viscosity of 44 centipoises.

By way of example of the effectiveness of the method of this invention in conditioning and reclaiming a cement-cut mud, there is mentioned the following application of the method to the treatment of a circulating mud in the drilling of a well in the West Columbia field of Texas. The mud was treated with a total of 325 pounds of sodium metasilicate, and 200 pounds of sodium hexametaphosphate during the continuance of the drilling, while flue gas was injected into the mud stream. Following this, the well casing was set and cemented. After the cement had set, the cement block was drilled through a distance of sixty feet. As the returns of the cement-contaminated mud reached the surface, the mud dropping from the flow line was visibly too viscous to obtain a funnel viscosity. However, when flue gases were violently mixed with this mud, the gel was converted to a fluid that flowed in the ditch. The pH of the cement-contaminated mud issuing from the well was 11.5; but by the use of sufficient carbon dioxide, this could be reduced to within the desirable range set forth above.

Obviously many modifications and variations of the invention, as hereinbefore set forth, may be made without departing from the spirit and scope thereof, and therefore only such limitations should be imposed as are indicated in the appended claims.

We claim:

1. The method of conditioning a drilling mud comprising an aqueous dispersion of clay to control the viscosity and other properties thereof during the circulation of the mud for well drilling through clay and shale which tend to deflocculate and accumulate in an alkaline mud stream to thereby objectionably increase the viscosity of the circulating mud, which comprises adding to the drilling mud an alkali metal silicate in a proportion to give an initial viscosity reduction but which would normally raise the pH of the mud above about 8.5 and thereby tend to increase the rate of deflocculation of the clay and shale into the mud stream and offset the said initial viscosity reduction, and also adding an acid-reacting material selected from the group consisting of carbon dioxide and a phosphoric acid to the mud stream in a controlled manner to maintain the pH of the circulating mud stream within the range of about 7.5 to 8.5 in the presence of the added alkali metal silicate.

2. The method according to claim 1, in which a small proportion of a water-soluble molecularly dehydrated sodium phosphate selected from the group consisting of sodium pyrophosphate, sodium triphosphate, sodium tetraphosphate, and sodium hexametaphosphate is also added to the mud stream.

3. The method according to claim 1, in which the alkali metal silicate is sodium silicate.

4. In the drilling of a well with the circulation of a drilling fluid comprising an aqueous dispersion of clay, the method of conditioning the drilling fluid which comprises adding to the fluid during the course of its circulation sodium silicate in an amount effective to reduce the viscosity thereof, and preventing subsequent rise in viscosity of the circulating drilling fluid by the addition of an acid-reacting material selected from the group consisting of carbon dioxide and a phosphoric acid effective to maintain the pH of the drilling fluid within the range of about 7.5 to 8.5.

5. The method of conditioning a drilling fluid comprising an aqueous dispersion of clay in the drilling of a well employing circulation of drilling fluid, which comprises adding to the fluid during the course of its circulation sodium silicate in an amount effective to reduce the viscosity thereof, and preventing subsequent rise in viscosity of the circulating drilling fluid by treating the latter with carbon dioxide in amount adapted to maintain the pH of the drilling fluid within the range of about 7.5 to 8.5.

6. The method of conditioning a drilling fluid comprising an aqueous dispersion of clay in the drilling of a well employing circulation of drilling fluid, which comprises adding to the fluid during the course of its circulation sodium silicate in an amount effective to reduce the viscosity thereof, and preventing subsequent rise in viscosity of the circulating drilling fluid by adding thereto a phosphoric acid in amount adapted to maintain the pH of the drilling fluid within the range of about 7.5 to 8.5.

7. The method of conditioning a drilling fluid comprising an aqueous dispersion of clay in the drilling of a well employing circulation of drilling fluid, which comprises adding to the fluid during the course of its circulation sodium silicate and a water-soluble molecularly dehydrated sodium phosphate selected from the group consisting of sodium pyrophosphate, sodium triphosphate, sodium tetraphosphate, and sodium hexametaphosphate in amounts effective to reduce the viscosity thereof, and preventing a subsequent rise in viscosity of the circulating fluid by treating the latter with carbon dioxide in amount adapted to maintain the pH of the drilling fluid within the range of about 7.5 to 8.5.

8. The method of conditioning a drilling fluid comprising an aqueous dispersion of clay in the drilling of a well employing circulation of drilling fluid, which comprises adding to the fluid during the course of its circulation sodium silicate and a water-soluble molecularly dehydrated phosphate viscosity-reducing agent in amounts effective to reduce the viscosity thereof, a portion of the molecularly dehydrated phosphate being added in the form of the corresponding acid to prevent a rise in pH of the drilling fluid containing the added sodium silicate and phosphate substantially above 8.5.

9. The method of conditioning a drilling mud comprising an aqueous dispersion of clay in the drilling of a well employing circulation of the drilling mud, which comprises adding to the mud during the course of its circulation about 0.05–0.15% of sodium silicate, and about 0.01–0.05% of a sodium salt of a molecularly dehydrated phosphate selected from the group consisting of sodium pyrophosphate, sodium triphosphate, sodium tetraphosphate, and sodium hexametaphosphate to reduce the viscosity thereof, and treating the circulating drilling mud with carbon dioxide in amount adapted to maintain the pH of the drilling mud within the range of about 7.5 to 8.5.

10. The method of conditioning a drilling mud comprising an aqueous dispersion of clay to control the viscosity and other properties thereof during the circulation of the mud for well drilling through clay and shale which tend to deflocculate and accumulate in an alkaline mud stream to thereby objectionably increase the viscosity of the circulating mud, which comprises treating the mud with sodium silicate in a proportion to give an initial viscosity reduction and raise the pH of the mud substantially above 8.5, and controlling the pH of the mud within the range of about 7.5 to 8.5 by the addition of an acid-reacting phosphoric acid material.

11. The method of conditioning a drilling fluid comprising an aqueous dispersion of clay in the drilling of a well employing circulation of drilling fluid, which comprises adding to the fluid during the course of its circulation sodium silicate and a water-soluble acid-reacting phosphoric acid composition comprising a molecularly dehydrated sodium phosphate selected from the group consisting of sodium pyrophosphate, sodium triphosphate, sodium tetraphosphate, and sodium hexametaphosphate in amounts effective to reduce the viscosity of the drilling fluid and maintain the pH of the drilling fluid within the range of about 7.5 to 8.5.

ALLEN D. GARRISON.
KARL C. TEN BRINK.